(12) United States Patent
Crompton et al.

(10) Patent No.: US 8,561,639 B1
(45) Date of Patent: Oct. 22, 2013

(54) FLOW CHECK VALVE ASSEMBLY AND METHOD

(71) Applicant: Quick Fitting, Inc., Warwick, RI (US)

(72) Inventors: David B. Crompton, Tiverton, RI (US); Libardo Ochoa Dias, Pawtucket, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

(21) Appl. No.: 13/756,658

(22) Filed: Feb. 1, 2013

(51) Int. Cl.
*F16K 31/12* (2006.01)

(52) U.S. Cl.
USPC ............ 137/498; 137/504; 137/509; 137/540

(58) Field of Classification Search
USPC .................. 137/498, 504, 505, 509, 511, 540
See application file for complete search history.

(56) References Cited

U.S. PATENT DOCUMENTS

| | | | | |
|---|---|---|---|---|
| 2,917,075 A | * | 12/1959 | Terry | 137/504 |
| 3,060,959 A | * | 10/1962 | Foster | 137/498 |
| 3,145,730 A | * | 8/1964 | Presnell | 137/493.2 |
| 4,437,493 A | * | 3/1984 | Okuda et al. | 138/45 |
| 4,480,729 A | * | 11/1984 | Porter | 188/300 |
| 5,251,655 A | * | 10/1993 | Low | 137/501 |
| 6,988,509 B2 | * | 1/2006 | Frampton et al. | 137/460 |
| 2010/0126603 A1 | * | 5/2010 | Yamaguchi | 137/511 |

* cited by examiner

*Primary Examiner* — Eric Keasel
*Assistant Examiner* — Jessica Cahill
(74) *Attorney, Agent, or Firm* — Williams Mullen, PC; Thomas F. Bergert (57) ABSTRACT

The present invention provides, in part, a valve assembly and method that maintains balance of flow to pressure. In one embodiment, the present invention includes a main body component, a chamber body component, a fluid control plate and seal, and a chamber cap. The chamber body component is adapted to slidingly engage the main body member. A spring assists in biasing the chamber body component in position within the main body component. The chamber cap with a sealing ring assists in preventing backflow of fluid into an outer body or tube member while also providing an opposing force to movement of the chamber body member within the main body member. A sealing ring is also provided around the head portion of the chamber body member. An additional sealing ring can be provided in a cavity on the outside of the main body member.

18 Claims, 8 Drawing Sheets

FLOW CHECK VALVE ASSEMBLY AND METHOD

FIELD OF THE INVENTION

The present invention relates to fluid flow systems, and more particularly to a check valve assembly that regulates fluid flow rate and enhances stoppage and re-starting of fluid flow in piping systems.

BACKGROUND OF THE PRESENT INVENTION

Piping systems exist to facilitate the flow of fluids (e.g., liquid, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, natural gases, cleaning chemicals, waste water, plant cooling water and paint and coatings are just some examples of the types of fluids and gases that can be deployed through piping systems. Tubing/piping types can include, for example, copper, stainless steel, CPVC (chlorinated polyvinyl chloride) and PEX (cross-linked polyethylene). For purposes of the present disclosure, the term "pipe" or "piping" will be understood to encompass one or more pipes, tubes, piping elements and/or tubing elements.

Piping connections are necessary to join various pieces of pipe and must be versatile in order to adapt to changes of pipe direction, fluid types and fluid flow rates required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, check valves and partial angle connectors, for example.

Valves have different purposes depending upon the application. Washing machines, heaters, sinks, ice makers and other home and commercial appliances typically operate with fluid flow valves in order to regulate fluid flow operations and prevent damage. For example, if a washing machine hose bursts, it can discharge hundreds of gallons of water in an hour or less, and cause catastrophic damage as a result. A flow check valve or stop valve can be provided on the washing machine and can include a sensor to sense the water flow and automatically shut the water off if a hose bursts, for example.

Check valves are provided with two ports—one that allows fluid to enter and one that allows fluid to leave. Check valves operate to allow fluid to flow in one direction only through the valve. Flow check valves operate to monitor and maintain the flow rate of fluid through the valve, regardless of the inbound pressure. In any piping system, maintaining the balance of fluid flow to fluid pressure is paramount. The present invention provides a flow check valve that maintains the balance of fluid flow to fluid pressure in a manner that avoids leaks, flooding and other valve problems in the event of downstream system failure.

SUMMARY OF THE PRESENT INVENTION

The present invention provides, in part, a check valve assembly and method that maintains balance of flow to pressure. In one embodiment, the present invention includes a main body component adapted to retain a chamber body component, a fluid control or flow check plate and seal, and a chamber cap. The chamber body component includes a head portion that is adapted at one end to engage an inner ridge member extending from the inner wall of the main body member, and is further adapted at another end to engage the flood stop control seal. The chamber body component is further slidably maintained within the main body component from a point where the head portion engages the inner ridge member of the main body component to a point where the head portion engages the control seal. A spring assists in biasing the chamber body component in position where the head portion engages the inner ridge member of the main body component. The chamber cap with a sealing ring assists in preventing backflow of fluid into an outer body or tube member while also providing an opposing force to movement of the chamber body member within the main body member. A sealing ring is also provided around the head portion of the chamber body member. An additional sealing ring can be provided in a cavity on the outside of the main body member to facilitate connection with an outer piping or tubing element.

As a check valve, the present invention is not necessarily concerned with preventing water or fluid from flowing back into the system. In one embodiment, the flow check plate (also known as a restrictor plate) of the present invention is secured to the flood stop control seal, which acts as a valve. The valve is biased in the open position and is set to allow certain flow (e.g., 2.5 gallons per minute) via the restrictor plate. The valve and plate are unaffected by the fluid pressure, but react to variations in the fluid flow. The remainder of the device acts as a regulator in order to maintain the balance of flow to pressure. For example, if pressure goes from 35 psi (pounds per square inch) to 80 psi within the device, the chamber body component (a.k.a., the piston) will be pushed towards the flood stop control seal and the spring will be compressed. The chamber body front end will eventually engage the flood stop control seal, at which time the overflow ports of the chamber body member will be inside an interior chamber of the device exposed to a positive displacement area formed between the main component and the chamber component. Further, the fluid diverted through the overflow ports will stay in this interior chamber and act to retain the piston in the engaged position preventing water flow through or past the valve. When the pressure subsides, the spring is then strong enough to expand and bring the piston back, allowing fluid flow past the valve and releasing the check. The overflow ports are then re-positioned back in the initial chamber exposed to an area between the main body component's ridge member and the chamber cap. Sealing rings act to prevent backflow of the fluid.

The valve assembly of the present invention can be inserted into existing piping or tubing systems as a retrofit device.

DETAILED DESCRIPTION OF THE PREFERRED EMBODIMENTS

Figure 1:
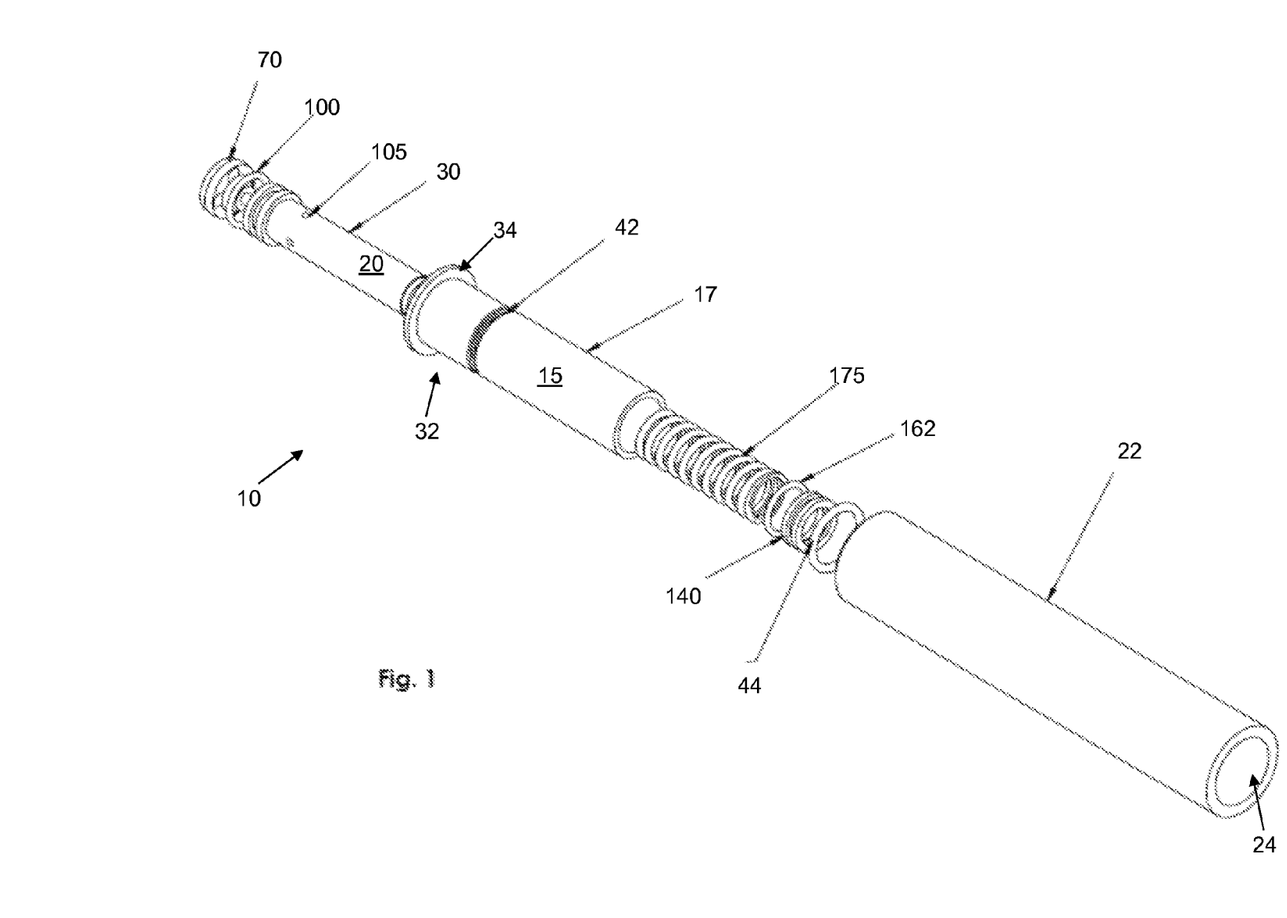
FIG. 1 is an exploded front perspective view of one embodiment of the valve assembly of the present invention.
Figure 2:
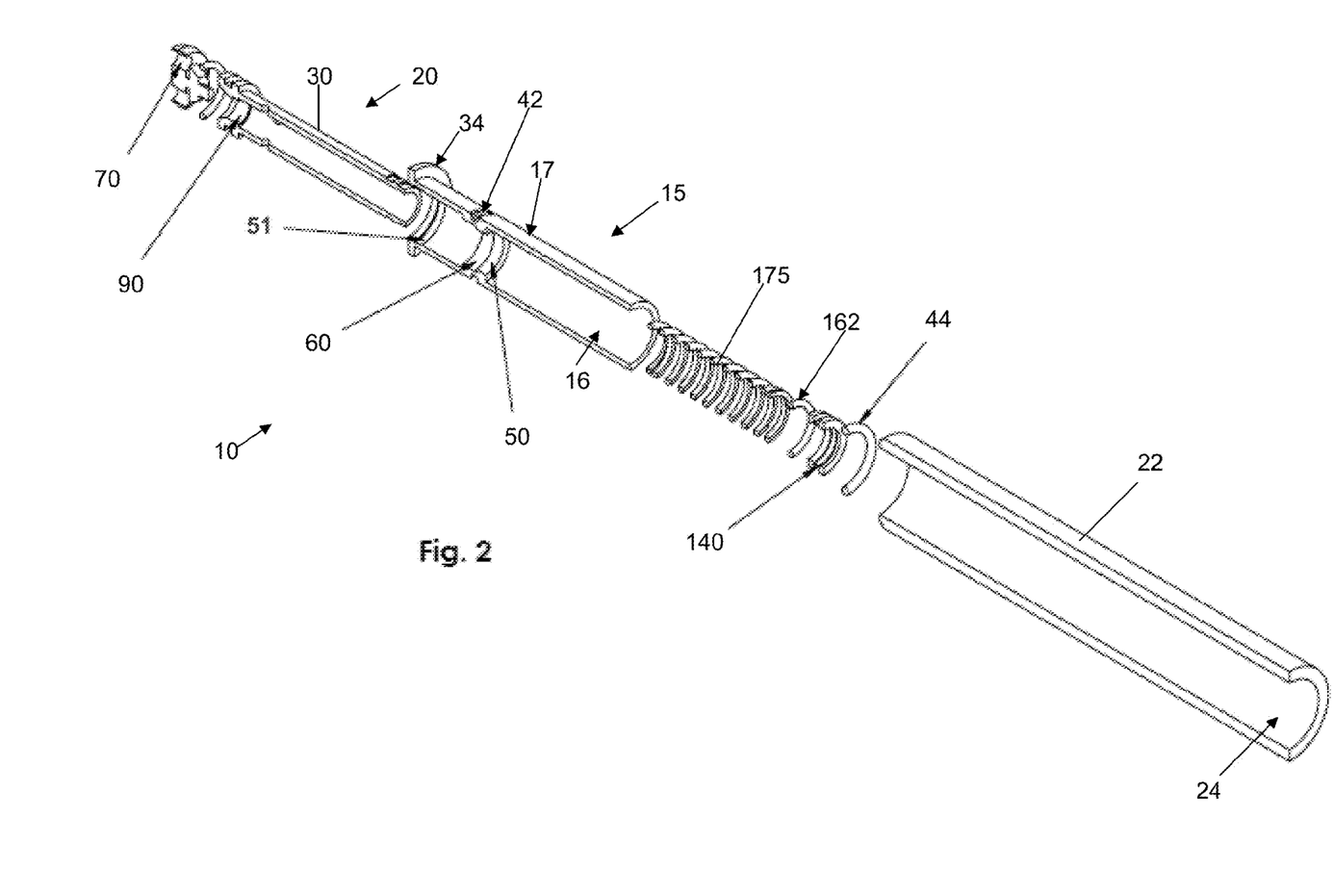
FIG. 2 is an exploded front perspective view of one embodiment of the valve assembly of the present invention, with components shown in cross-section.
Figures 3A, 3B:
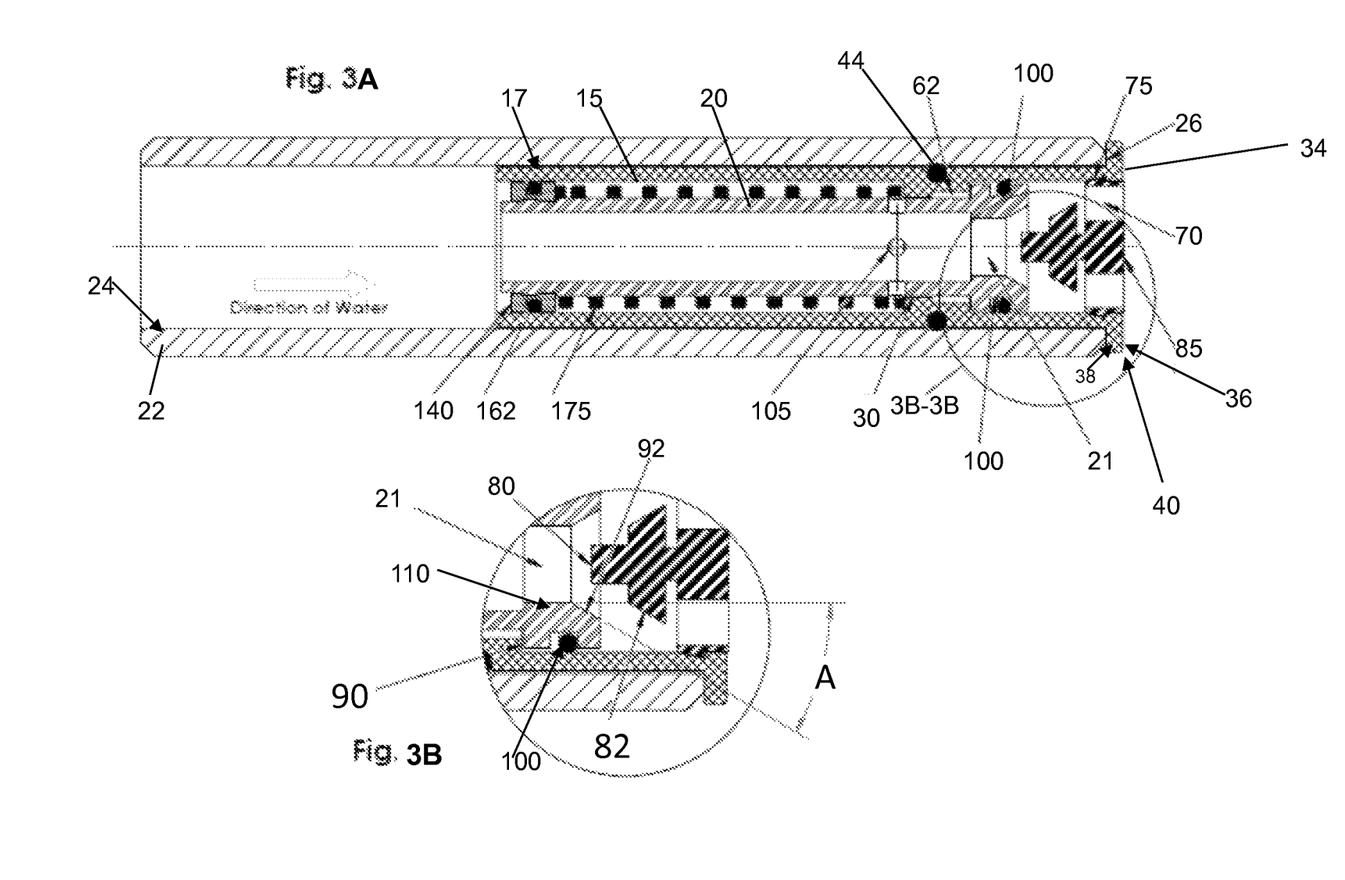
FIG. 3A is a front view in cross-section of one embodiment of the valve assembly of the present invention within a piping or tubing element.
FIG. 3B is a breakout view of encircled portion 3B-3B of FIG. 3A.

As shown in FIGS. 1-15, the valve assembly 10 of the present invention includes a main body component 15 and a chamber body component 20. It will be appreciated that a tubing component 22 need not necessarily form part of the valve assembly of the present invention but may be an established piping or tubing element to which the present invention is affixed or installed. As shown in FIGS. 3A-3B, tubing component 22 is substantially cylindrical and includes a hollow cavity extending axially therethrough, into which the main body component 15 of the present invention is insertable and retainable.

The main body component 15 and chamber body component 20 are substantially cylindrical bodies with fluid passageways extending axially therethrough, and these components are axially aligned when engaged in accordance with the present invention. In one embodiment of the present invention, main body component 15 and chamber body component 20 are made of brass. In another embodiment of the present invention, one or both of these components may consist of copper or nylon, or other suitable material for the purposes undertaken in accordance with the present invention. The outer wall 30 of chamber body component 20 is capable of slidingly engaging the inner wall 16 of main body component, and the outer wall 17 of main body component 15 is capable of securely engaging the inner wall 24 of tubing component 22.

Figure 9:
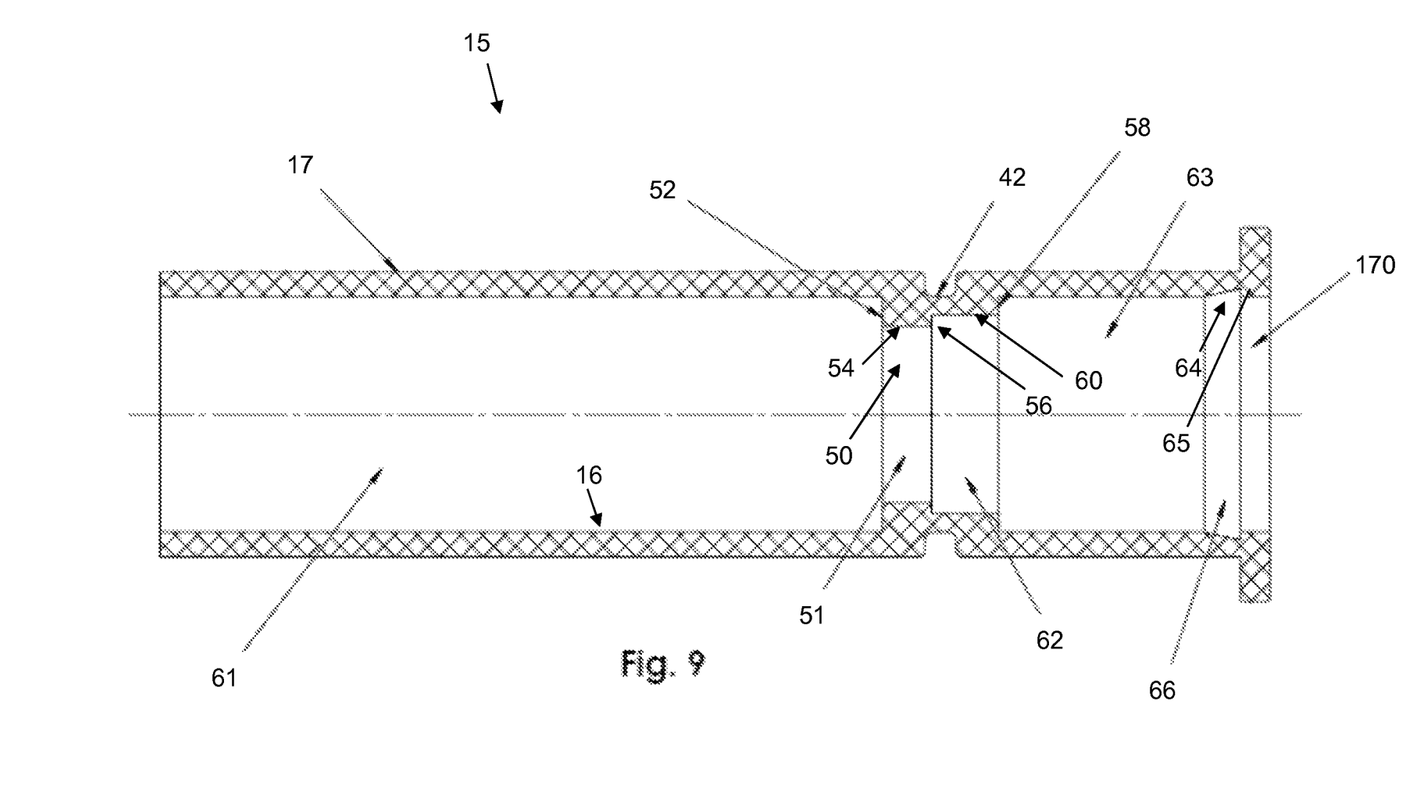
FIG. 9 is a front view of one embodiment of the main body component of the present invention.

As shown in the embodiment of the present invention of FIGS. 1 to 3B, main body component 15 includes a rim element 34 that extends radially outwardly from a first end 32 thereof. The rim element 34 includes a top face portion 36, a bottom face portion 38 and an outer edge portion 40. The bottom face portion 38 is engageable with a front face wall 26 of tubing component 22 when the valve assembly of the present invention is engaged for operation with tubing component 22. As further shown in FIGS. 1-3, 7 and 9, the outer wall 17 of main body component 15 is indented inwardly so as to provide a receiving cavity 42 for a sealing ring or "O-ring" 44, which facilitates tight retention and smooth fit of the main body component 15 with the tubing component 22. Also, the inner wall 16 of main body component 15 is formed with an indented, radially inwardly extending interior ridge element 50, which assists in providing a channel 51 and a physical resistance structure employed by the chamber body 20 and further assists in establishing a positive displacement area during operation of the present invention as will be described hereinafter. In one embodiment of the present invention, as shown in FIG. 9, the ridge element 50 is positioned axially inwardly of the outer wall receiving cavity 42 of main body component 15. The outer sealing ring 44 maintained within the receiving cavity 42 prevents fluid from flowing outside of main body 15 during operation of the present invention. Ridge element 50 is formed as part of main body component 15 and, in one embodiment of the present invention, includes a spring engaging wall face 52, a radially inner wall face 54, a radially inner side wall 56, a chamber body engaging face 58, and a radially intermediate wall face 60. As shown in FIG. 9, the radially intermediate wall face 60 does not extend as far into positive displacement cavity 62 of the main body component 15 as the radially inner wall face 54. The radially intermediate wall face 60 and the radially inner side wall 56 form the positive displacement cavity 62.

Figure 11:
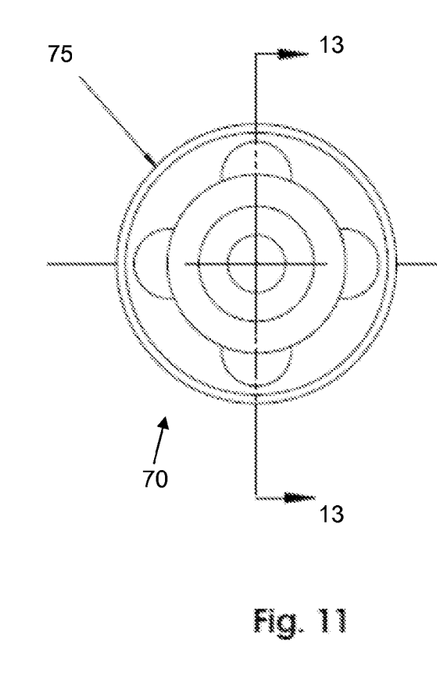
FIG. 11 is a front view of one embodiment of the restrictor plate and flood stop seal components of the present invention.
Figure 12:
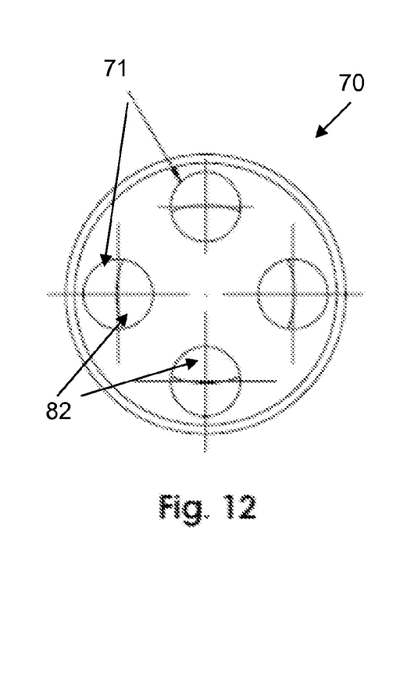
FIG. 12 is a back view of the embodiment of the components of FIG. 11.
Figure 13:
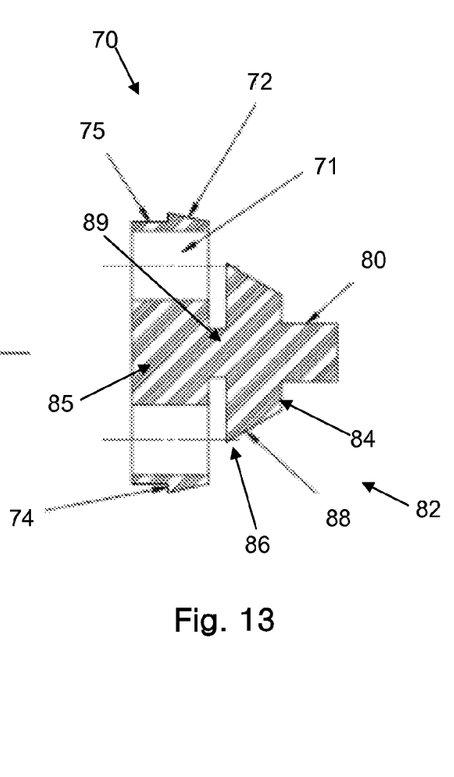
FIG. 13 is a left side cross-sectional view of the embodiment of the components of FIG. 11, taken along the line 13-13 of FIG. 11.
Figure 14:
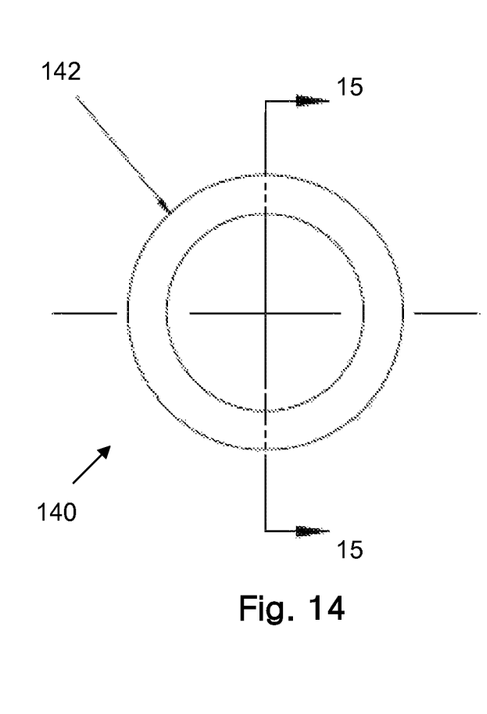
FIG. 14 is a front view of one embodiment of the chamber cap of the present invention.
Figure 15:
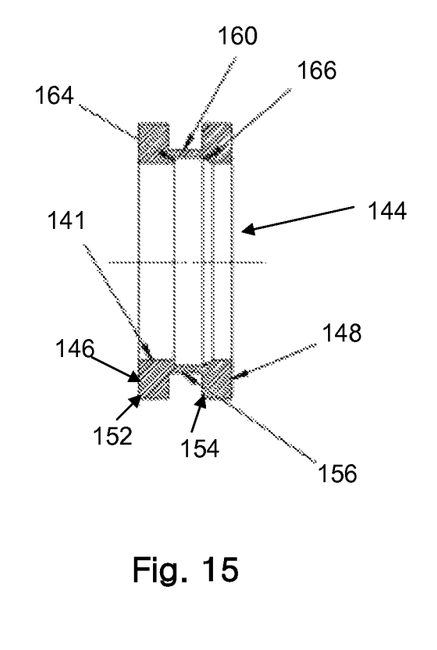
FIG. 15 is a left side cross-sectional view of the chamber cap of FIG. 14, taken along the line 15-15 of FIG. 14.

As shown in FIG. 9, main body component inner wall 16 defines inner cavity 61, which is the main compression area or chamber of the present invention. Main body component inner wall 16 also defines a secondary chamber 63 into which the chamber body can enter as part of the operation of the present invention described in more detail hereafter. Inner wall 16 also includes a radially outwardly extending indentation 64 near the rim element 34 that forms a retaining edge 65 and a plate retention cavity 66 for receiving the outer edge 75 and specifically edge walls 72, 74 of a fluid control plate 70 (see FIG. 13, for example). The fluid control plate 70 helps manage the flow of fluid within the valve 10 assembly of the present invention. In one embodiment of the present invention as shown in FIGS. 11 and 12, the fluid control plate 70 is designed with one or more fluid control plate flow ports 71 to allow fluid to flow therethrough. The fluid control plate 70 also includes a flow restrictor 80 extending axially inwardly and into the cavity or secondary chamber 63 of the main body component 15. In one embodiment of the present invention, the flow restrictor 80 includes a flood stop control seal or plunger seal 82 that assists in sealing the fluid flow during operation of the device, when required. As shown in FIG. 13, the control seal 82 can have a narrower flow-facing end 84 tapered to a wider downstream end 86, resulting in a substantially trapezoidal shaped cross sectional appearance. The edge 88 of the control seal 80 is adapted to mate with the inner seal-engaging wall 92 of the chamber body component 20, as described hereinafter. The flow restrictor 80 can also be connected to a control plate neck portion 89, which connects restrictor 80 with the fluid control plate 70, as shown in FIGS. 11 and 12. The edge 75 of the fluid control plate can be considered a stabilizer edge and wall 74 can be considered a snap slope edge in that the fluid control plate can snap into position within the main body member as a result of the formed indentation 64 in the main body member inner wall 16. In one embodiment of the present invention, the fluid control plate 70 and the flow restrictor 80 with flood stop control seal 82 are separate components, with the main body 85 of the flow restrictor 80 being insertable and retainable within fluid control plate 70. In one embodiment of the present invention, the fluid control plate 70 can be formed of a polymeric material such as polyoxymethylene (POM) and the flow restrictor 80 with flood stop control seal 82 can be formed of EPDM rubber (ethylene propylene diene monomer (M-class) rubber) material. Similarly, the sealing rings described herein can be formed of EPDM rubber, for example, in accordance with one embodiment of the present invention. Further, the sealing rings can be optionally lubricated using a food grade lubricant, for example.

Figure 6:
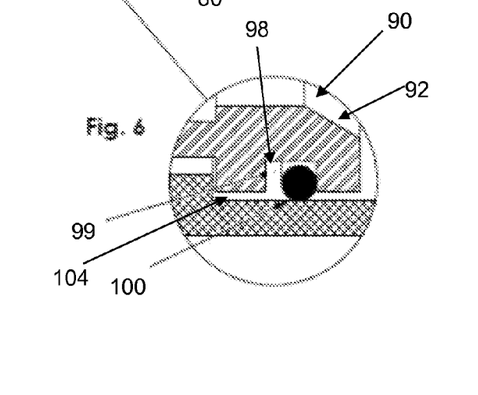
FIG. 6 is a breakout view of encircled portion 6-6 of FIG. 4.
Figure 10:
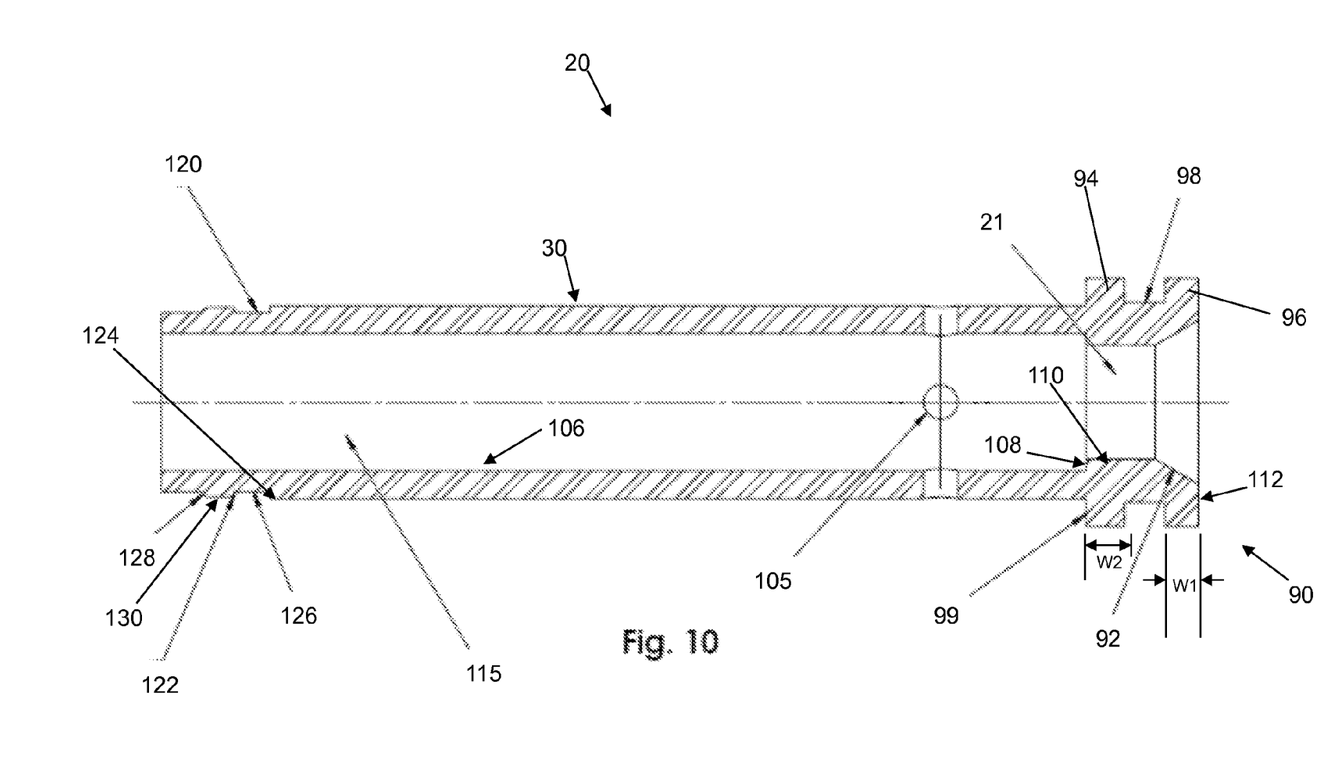
FIG. 10 is a front view of one embodiment of the chamber body component of the present invention.

As shown in FIG. 10, chamber body component 20 can take the form of a substantially cylindrical body element having a channel or cavity 21 therethrough to permit axial flow of fluids. At one end of component 20, a chamber head portion 90 includes a pair of notches 94, 96 extending radially outwardly from the outer wall 30. In one embodiment of the invention, the axially outermost notch 96 has a slightly lower width W1 than the width W2 of axially inner notch 94, and the notches define a chamber head portion seal cavity 98 therebetween. Cavity 98 can retain a chamber head sealing member 100 that rolls with the chamber body component and facilitates a strong seal to prevent fluid from passing the chamber head portion during operation of the present invention. In one embodiment of the present invention as shown in FIG. 6, for example, the seal cavity 98 is wider than the diameter of the dynamic sealing member 100, which exposes the sealing member 100 to less compression during operation. The sealing member 100 acts to force fluid to go inside the cavity of the chamber body component 20 during operation. Inner notch 94 includes a radially extending interior wall 99 that engages chamber body engaging face 58 of the ridge member 50 of main body member 15 during operation of the present invention.

Figures 4, 5:
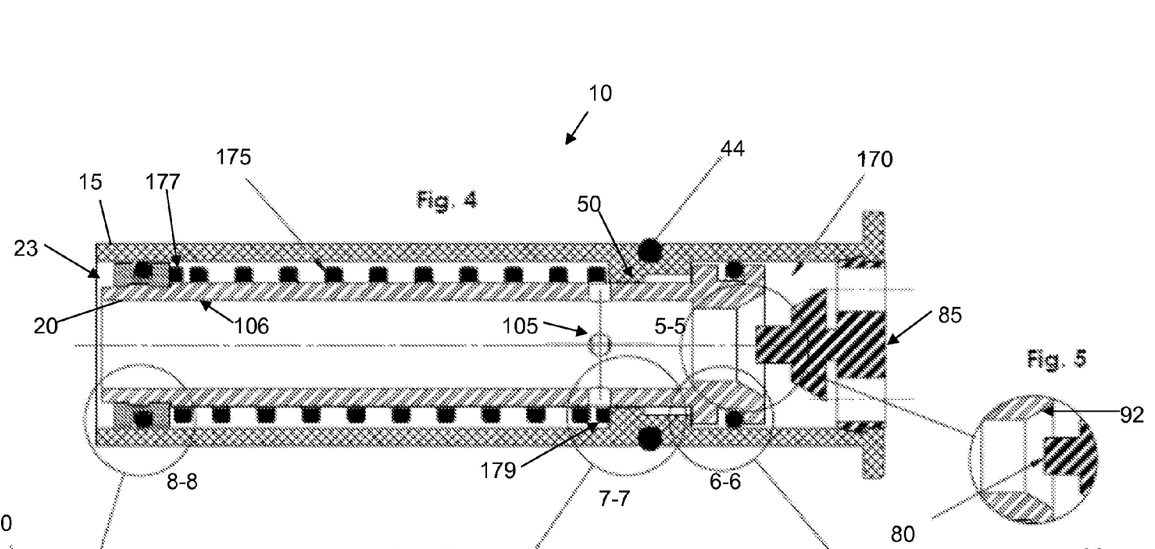
FIG. 4 is a front view in cross-section of one embodiment of the valve assembly of the present invention in isolation.
FIG. 5 is a breakout view of encircled portion 5-5 of FIG. 4.
Figures 7, 8:
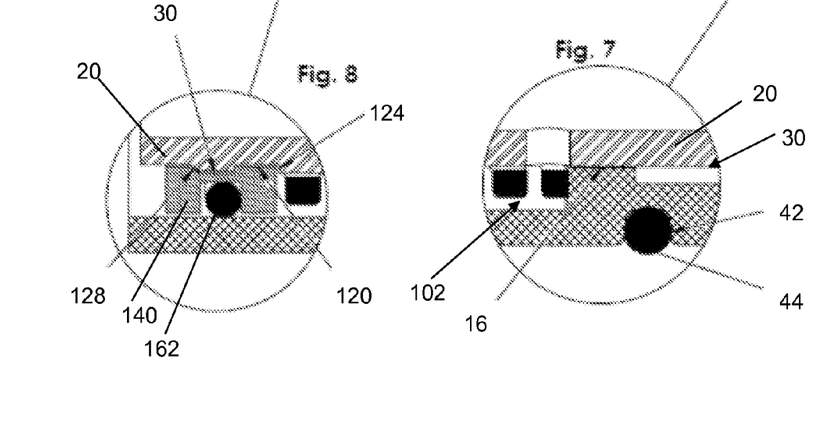
FIG. 7 is a breakout view of encircled portion 7-7 of FIG. 4.
FIG. 8 is a breakout view of encircled portion 8-8 of FIG. 4.

As further shown in FIGS. 4 and 10, the chamber body component 20 is of appropriate diameter to snugly and slidably engage ridge element 50 of main body component 15. In this way, the chamber body component 20 is not permitted to veer off its axial course during operation, and space is provided appropriately between the outer wall 30 of the chamber body component 20 on both sides 102, 104 of the ridge element to permit fluid flow, as shown in FIGS. 6 and 7, for example. As further shown in FIGS. 4 and 10, the chamber body component 20 is formed to include one or more propulsion ports 105 in order to permit fluid to flow in and out of the cavity of the chamber body component during operation. For example, the propulsion ports 105 can be placed to function only upon saturation of the flow area, as will be described in more detail hereafter.

As shown in FIGS. 4 and 10, the inner wall 106 of the chamber body component 20 extends axially inwardly at a position that is axially aligned with notch 94. The inner wall 106 is thus formed with a flow-facing edge 108, a secondary inner wall 110 and a seal engaging face 92. The seal engaging face 92 angles away from the secondary inner wall 110 towards a front edge 112 of the chamber head portion 90 of the chamber body component 20. In one embodiment of the present invention, as shown in FIG. 3-3, the angle A at which the seal engaging face 92 angles away from the secondary inner wall 110 is approximately thirty degrees, but angle A can range between fifteen and forty-five degrees, for example, while still functioning properly in accordance with the present invention. The edge 88 of the flood stop control seal 82 includes an angle that matches or substantially matches the angle A of the seal engaging face 92 to facilitate optimal engagement and sealing.

As shown in FIGS. 4 and 10, the outer wall 30 of the chamber body component 20 at the end 115 opposite the chamber head 90 is formed to receive a chamber cap 140. The outer wall 30 can be provided with a chamber cap stabilizer area 120 formed by edges 122, 124 and base 126, and can further be provided with a sloping edge 128 axially outwardly of the axially outermost notched area 130.

As shown in FIGS. 1, 2, 14 and 15, a chamber cap 140 is provided in the form of a substantially cylindrical-shaped body 142 having a cavity 144 extending axially therethrough. The cavity permits the cap 140 to securely engage the outer walls of the chamber body component 20. The body 142 includes substantially parallel sealing ring retention walls 146, 148 which extend radially inwardly and outwardly of the body 142. The radially outward extending portions 152, 154 of the retention walls 146, 148 cooperate with an outer wall portion 156 of the body 142 to define a retaining cavity 160 for retaining a sealing ring 162 (shown in FIGS. 1-3), which prevents backflow of fluid into the outer tubing and provides an opposing force to movement of the chamber body member 20 during operation of the present invention. As shown, for example, in FIGS. 8 and 10, the inner wall portion 141 of the body 142 of chamber cap 140 and inner walls 164, 166 of respective retention walls 146, 148 cooperatively engage the sloping edge 128 and the edges 122, 124, 126 forming the chamber cap stabilizer area 120 of the outer wall 30 of the chamber body component 20.

As shown in FIGS. 1-4, a compression spring 175 is positionable around the outer surface of chamber body member 20, with a first end 177 positioned securely against chamber cap 140 and a second end 179 positioned securely against spring engaging wall face 52 of ridge element 50. In one embodiment of the present invention, the spring 175 is formed of steel, and is in a relaxed, expanded state when fluid flow rates are desirable while increasingly being compressed as fluid pressure increases and chamber body member slides towards the restrictor plate 70.

With regard to assembly of the valve device of the present invention, the chamber body component 20 is inserted through the opening 170 at the end of the body component adjacent the rim 34, with sealing member 44 as shown in FIGS. 4, 7 and 9, and then the fluid control plate 70 with flood stop control seal 82 is inserted and secured into the portion of the main body component 15 adjacent the rim 34. The pressure compensator spring 175 is then inserted through the opposite end of the body until it engages the spring engaging wall face 52 of ridge element 50 of the main body component 15. The spring assists in biasing the chamber body member 20 in a way whereby fluid can flow through the device, and further assists in pulling the chamber body member 20 back into the primary chamber once fluid flow has been normalized after a sealing event. Next, the chamber cap 140 is inserted through the same end of the main body component as the spring 175, and the chamber cap axially inner retention wall 148 extends over the sloping edge 128 and into chamber cap stabilizer area 120 described above. Sealing member 162 is inserted with chamber cap 140. Sealing ring 44 is then supplied around the outer wall of main body member 15 and into chamber 42 to help provide an external seal compression force when main body member 15 is inserted into tubing element 22.

In operation, fluid such as water enters from tubing element 22 into the valve assembly 10 of the present invention at the end opposite the fluid control plate 70. It will be appreciated that, while FIG. 3 illustrates a "direction of water" arrow in the diagram, the present invention can accommodate fluids other than water. The fluid enters at a fluid rate measured, for example, in gallons per minute. If the fluid flow maintains the desired rate (e.g., 2.4 gallons per minute), the valve assembly 10 is unaffected and permits free flow through the cavity of the chamber body component 20 and past the flow stop control seal 82 and through the ports 71 in the fluid control plate 70. If the incoming fluid flow increases, fluid pressure will build up outside of the chamber body component 20 and will extend around the end of the chamber body component (for example, into area 23 shown in FIG. 4) to push the chamber cap 140 towards the fluid control plate end of the assembly. In this process, the chamber body component 20 will come closer to the fluid sealing member 82. Additionally, propulsion ports 105 will move from a position where they permit fluid to evacuate the chamber body member into channels (e.g., 102 in FIG. 7) alongside spring 175, to where they permit fluid to evacuate the chamber body member 20 in the positive displacement cavity 62 and chamber 104 (see FIG. 6) beyond the ridge member 50 of the main body member 15. The propulsion ports 105 thus facilitate some evacuation of water from the chamber body member 20, but ultimately allow the fluid to continue building up and pushing the chamber body member 20 towards the fluid control seal 82, since the positive displacement cavity 62 is relatively small, and the chamber body member will be pushed by fluid within cavity 62 as the fluid pressure builds up against chamber head portion 90. When the fluid flow is so great that the fluid control seal 82 seals against the seal engaging edge 92 of the chamber body component 20, no more fluid can exit through the fluid control plate 70. Once the flow rate is reduced externally (e.g., from the incoming area 23 in FIG. 4), the pressure on the chamber body component 20 is relaxed, and the chamber body component is returned via pressure from the spring member 175 away from the fluid control seal 82.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A valve assembly, comprising:
   a substantially cylindrical-shaped main body component having an inner wall defining a cavity extending axially through the main body component, with the inner wall further having a ridge element extending radially inwardly therefrom;
   a substantially cylindrical-shaped chamber body component having an inner wall defining a cavity extending axially through the chamber body component, with the chamber body component having an outer wall that is slidably engageable with the ridge element;
   a fluid control plate secured within a first end of the main body component; and
   a chamber cap slidably engageable with the inner wall of the main body component and secured to the outer wall of the chamber body component,
   wherein the ridge element includes a radially inner wall, a radially intermediate wall, a chamber body engaging face and a radially inner side wall, wherein the chamber body outer wall is slidably engageable with the radially inner wall, and wherein the radially intermediate wall face and the radially inner side wall form a positive displacement cavity.

2. A valve assembly, comprising:
   a substantially cylindrical-shaped main body component having an inner wall defining a cavity extending axially through the main body component, with the inner wall further having a ridge element extending radially inwardly therefrom;
   a substantially cylindrical-shaped chamber body component having an inner wall defining a cavity extending axially through the chamber body component, with the chamber body component having an outer wall that is slidably engageable with the ridge element;
   a fluid control plate secured within a first end of the main body component; and
   a chamber cap slidably engageable with the inner wall of the main body component and secured to the outer wall of the chamber body component; and
   a spring member secured around the chamber body component, wherein the ridge element includes a spring member engaging wall, and further wherein the spring member is adapted to engage the spring member engaging wall of the ridge element at a first end of the spring member and is further adapted to engage the chamber cap at a second end of the spring member.

3. A valve assembly, comprising:
   a substantially cylindrical-shaped main body component having an inner wall defining a cavity extending axially through the main body component, with the inner wall further having a ridge element extending radially inwardly therefrom;
   a substantially cylindrical-shaped chamber body component having an inner wall defining a cavity extending axially through the chamber body component, with the chamber body component having an outer wall that is slidably engageable with the ridge element, wherein the chamber body component is bored so as to provide at least one bore hole permitting two-way fluid passage between an area inside the chamber body component and an area outside the chamber body component, wherein the two-way fluid passage is permitted through the at least one bore hole at axial positions on either side of the ridge element of the main body component;
   a fluid control plate secured within a first end of the main body component; and
   a chamber cap slidably engageable with the inner wall of the main body component and secured to the outer wall of the chamber body component.

4. A method for providing a valve assembly, comprising:
   providing a substantially cylindrical-shaped main body component having an inner wall defining a cavity extending axially through the main body component, with the inner wall further having a ridge element extending radially inwardly therefrom;
   inserting a substantially cylindrical-shaped chamber body component into the main body component, wherein the chamber body component has an inner wall defining a cavity extending axially through the chamber body component, and further has an outer wall that is slidably engageable with the ridge element;
   securing a fluid control plate within a first end of the main body component; and
   inserting a chamber cap within a second end of the main body component, such that the chamber cap is slidably engageable with the inner wall of the main body component and is further secured to the outer wall of the chamber body component,
   wherein the ridge element includes a radially inner wall, a radially intermediate wall, a chamber body engaging face and a radially inner side wall, wherein the chamber body outer wall is slidably engageable with the radially inner wall, and wherein the radially intermediate wall face and the radially inner side wall form a positive displacement cavity.

5. A method for providing a valve assembly, comprising:
   providing a substantially cylindrical-shaped main body component having an inner wall defining a cavity extending axially through the main body component, with the inner wall further having a ridge element extending radially inwardly therefrom;

inserting a substantially cylindrical-shaped chamber body component into the main body component, wherein the chamber body component has an inner wall defining a cavity extending axially through the chamber body component, and further has an outer wall that is slidably engageable with the ridge element;

securing a fluid control plate within a first end of the main body component; and inserting a chamber cap within a second end of the main body component, such that the chamber cap is slidably engageable with the inner wall of the main body component and is further secured to the outer wall of the chamber body component, and securing a spring member around the chamber body component, wherein the ridge element includes a spring member engaging wall, and further wherein the spring member is adapted to engage the spring member engaging wall of the ridge element at a first end of the spring member and is further adapted to engage the chamber cap at a second end of the spring member.

6. A method for providing a valve assembly, comprising:

providing a substantially cylindrical-shaped main body component having an inner wall defining a cavity extending axially through the main body component, with the inner wall further having a ridge element extending radially inwardly therefrom;

inserting a substantially cylindrical-shaped chamber body component into the main body component, wherein the chamber body component has an inner wall defining a cavity extending axially through the chamber body component, and further has an outer wall that is slidably engageable with the ridge element;

boring at least one bore hole in the chamber body component so as to permit two-way fluid passage between an area inside the chamber body component and an area outside the chamber body component, wherein the two-way fluid passage is permitted through the at least one bore hole at axial positions on either side of the ridge element of the main body component;

securing a fluid control plate within a first end of the main body component; and inserting a chamber cap within a second end of the main body component, such that the chamber cap is slidably engageable with the inner wall of the main body component and is further secured to the outer wall of the chamber body component.

7. A valve assembly, comprising:

a substantially cylindrical-shaped main body component having an inner wall defining a cavity extending axially through the main body component, with the inner wall further having a ridge element extending radially inwardly therefrom;

a substantially cylindrical-shaped chamber body component having an inner wall defining a cavity extending axially through the chamber body component, with the chamber body component having an outer wall that is slidably engageable with the ridge element, wherein the chamber body component further includes a head portion;

a fluid control plate secured within a first end of the main body component, wherein the fluid control plate includes a flood stop control seal extending axially inwardly of the fluid control plate and within the main body component, and wherein the flood stop control seal is adapted to engage the head portion of the chamber body component when the chamber body component is pushed via fluid pressure towards the fluid control plate; and a chamber cap slidably engageable with the inner wall of the main body component and secured to the outer wall of the chamber body component.

8. The valve assembly of claim 7, wherein the chamber cap is adapted to retain a chamber cap sealing member, and wherein the chamber cap sealing member is adapted to engage the inner wall of the main body component.

9. The valve assembly of claim 7, wherein the ridge element includes a chamber body engaging face, wherein the chamber body component includes a head portion having a pair of notches extending radially outwardly from the outer wall of the chamber body component, and wherein a first one of the pair of notches is adapted to contact the chamber body engaging face of the ridge element.

10. The valve assembly of claim 9, further including a seal member secured between the pair of notches of the head portion of the chamber body component, wherein the seal member is adapted to engage the inner wall of the main body component.

11. The valve assembly of claim 7 wherein the outer surface of the main body component is indented to form an outer sealing ring cavity, and further including an outer sealing ring maintained within the outer sealing ring cavity.

12. The valve assembly of claim 11 wherein the outer surface of the main body component is indented at an axial location corresponding to the relative axial position of the ridge element extending radially inwardly from the inner surface of the main body component.

13. A method for providing a valve assembly, comprising:

providing a substantially cylindrical-shaped main body component having an inner wall defining a cavity extending axially through the main body component, with the inner wall further having a ridge element extending radially inwardly therefrom;

inserting a substantially cylindrical-shaped chamber body component into the main body component, wherein the chamber body component has an inner wall defining a cavity extending axially through the chamber body component, and further has an outer wall that is slidably engageable with the ridge element, wherein the chamber body component further includes a head portion;

securing a fluid control plate within a first end of the main body component, wherein the fluid control plate includes a flood stop control seal extending axially inwardly of the fluid control plate and within the main body component, and wherein the flood stop control seal is adapted to engage the head portion of the chamber body component when the chamber body component is pushed via fluid pressure towards the fluid control plate; and inserting a chamber cap within a second end of the main body component, such that the chamber cap is slidably engageable with the inner wall of the main body component and is further secured to the outer wall of the chamber body component.

14. The method of claim 13, wherein the chamber cap is adapted to retain a chamber cap sealing member, and wherein the chamber cap sealing member is adapted to engage the inner wall of the main body component.

15. The method of claim 13, wherein the ridge element includes a chamber body engaging face, wherein the chamber body component includes a head portion having a pair of notches extending radially outwardly from the outer wall of the chamber body component, and wherein a first one of the pair of notches is adapted to contact the chamber body engaging face of the ridge element.

16. The method of claim 15, further including the step of securing a seal member between the pair of notches of the head portion of the chamber body component, wherein the seal member is adapted to engage the inner wall of the main body component.

17. The method of claim 13, wherein the outer surface of the main body component is indented to form an outer sealing ring cavity, and further including an outer sealing ring maintained within the outer sealing ring cavity.

18. The method of claim 17 wherein the outer surface of the main body component is indented at an axial location corresponding to the relative axial position of the ridge element extending radially inwardly from the inner surface of the main body component.

\* \* \* \* \*